US008707673B1

(12) United States Patent
Flanagan et al.

(10) Patent No.: US 8,707,673 B1
(45) Date of Patent: Apr. 29, 2014

(54) ARTICULATED TRANSITION DUCT IN TURBOMACHINE

(71) Applicant: General Electric Company, Schenectady, NY (US)

(72) Inventors: James Scott Flanagan, Simpsonville, SC (US); Kevin Weston McMahan, Greer, SC (US); Jeffrey Scott LeBegue, Simpsonville, SC (US); Ronnie Ray Pentecost, Travelers Rest, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/734,156

(22) Filed: Jan. 4, 2013

(51) Int. Cl.
*F02C 3/00* (2006.01)

(52) U.S. Cl.
USPC .......... 60/39.37

(58) Field of Classification Search
USPC .......... 60/39.37, 752–760, 796–800
See application file for complete search history.

(56) References Cited

U.S. PATENT DOCUMENTS

| | | | | |
|---|---|---|---|---|
| 3,672,162 | A * | 6/1972 | Rygelis et al. | 60/800 |
| 4,422,288 | A | 12/1983 | Steber | |
| 5,077,967 | A | 1/1992 | Widener et al. | |
| 5,118,120 | A | 6/1992 | Drerup et al. | |
| 5,149,250 | A | 9/1992 | Plemmons et al. | |
| 5,249,920 | A | 10/1993 | Shepherd et al. | |
| 5,400,586 | A * | 3/1995 | Bagepalli et al. | 60/800 |
| 5,414,999 | A | 5/1995 | Barnes | |
| 5,457,954 | A | 10/1995 | Boyd et al. | |
| 5,592,820 | A | 1/1997 | Alary et al. | |
| 5,761,898 | A | 6/1998 | Barnes et al. | |
| 5,839,283 | A | 11/1998 | Dobbeling | |
| 5,934,687 | A | 8/1999 | Bagepalli et al. | |
| 5,987,879 | A * | 11/1999 | Ono | 60/800 |
| 6,076,835 | A | 6/2000 | Ress et al. | |
| 6,202,420 | B1 | 3/2001 | Zarzalis et al. | |
| 6,203,025 | B1 | 3/2001 | Hayton | |
| 6,431,555 | B1 | 8/2002 | Schroder et al. | |
| 6,431,825 | B1 | 8/2002 | McLean | |
| 6,442,946 | B1 | 9/2002 | Kraft et al. | |
| 6,471,475 | B1 | 10/2002 | Sasu et al. | |
| 6,537,023 | B1 | 3/2003 | Aksit et al. | |
| 6,564,555 | B2 | 5/2003 | Rice et al. | |
| 6,652,229 | B2 | 11/2003 | Lu | |
| 6,662,567 | B1 | 12/2003 | Jorgensen | |
| 7,007,480 | B2 | 3/2006 | Nguyen et al. | |
| 7,024,863 | B2 | 4/2006 | Morenko | |
| 7,082,770 | B2 * | 8/2006 | Martling et al. | 60/796 |
| 7,181,914 | B2 | 2/2007 | Pidcock et al. | |
| 7,555,906 | B2 * | 7/2009 | Anichini et al. | 60/799 |
| 7,584,620 | B2 | 9/2009 | Weaver et al. | |

(Continued)

*Primary Examiner* — Phutthiwat Wongwian
(74) *Attorney, Agent, or Firm* — Dority & Manning, PA

(57) ABSTRACT

Turbine systems are provided. A turbine system includes a transition duct comprising an inlet, an outlet, and a duct passage extending between the inlet and the outlet and defining a longitudinal axis, a radial axis, and a tangential axis. The outlet of the transition duct is offset from the inlet along the longitudinal axis and the tangential axis. The duct passage includes an upstream portion and a downstream portion. The upstream portion extends from the inlet between an inlet end and an aft end. The downstream portion extends from the outlet between an outlet end and a head end. The turbine system further includes a joint coupling the aft end of the upstream portion and the head end of the downstream portion together. The joint is configured to allow movement of the upstream portion and the downstream portion relative to each other about or along at least one axis.

13 Claims, 7 Drawing Sheets

(56) References Cited

U.S. PATENT DOCUMENTS

| | | | | |
|---|---|---|---|---|
| 7,637,110 | B2 | 12/2009 | Czachor et al. | |
| 7,721,547 | B2 | 5/2010 | Bancalari et al. | |
| 7,926,283 | B2 * | 4/2011 | Byrne et al. | 60/752 |
| 8,079,219 | B2 * | 12/2011 | Johnson et al. | 60/752 |
| 8,448,450 | B2 * | 5/2013 | LeBegue et al. | 60/796 |
| 2009/0288422 | A1 * | 11/2009 | Cernay et al. | 60/800 |
| 2010/0037617 | A1 | 2/2010 | Charron et al. | |
| 2010/0037618 | A1 | 2/2010 | Charron et al. | |
| 2010/0037619 | A1 | 2/2010 | Charron | |
| 2010/0115953 | A1 | 5/2010 | Davis, Jr. et al. | |
| 2010/0180605 | A1 | 7/2010 | Charron | |
| 2011/0067402 | A1 * | 3/2011 | Wiebe et al. | 60/740 |
| 2011/0259015 | A1 | 10/2011 | Johns et al. | |
| 2012/0180500 | A1 * | 7/2012 | DiCintio | 60/796 |
| 2013/0008177 | A1 * | 1/2013 | LeBegue et al. | 60/796 |
| 2013/0008178 | A1 * | 1/2013 | LeBegue et al. | 60/796 |

* cited by examiner

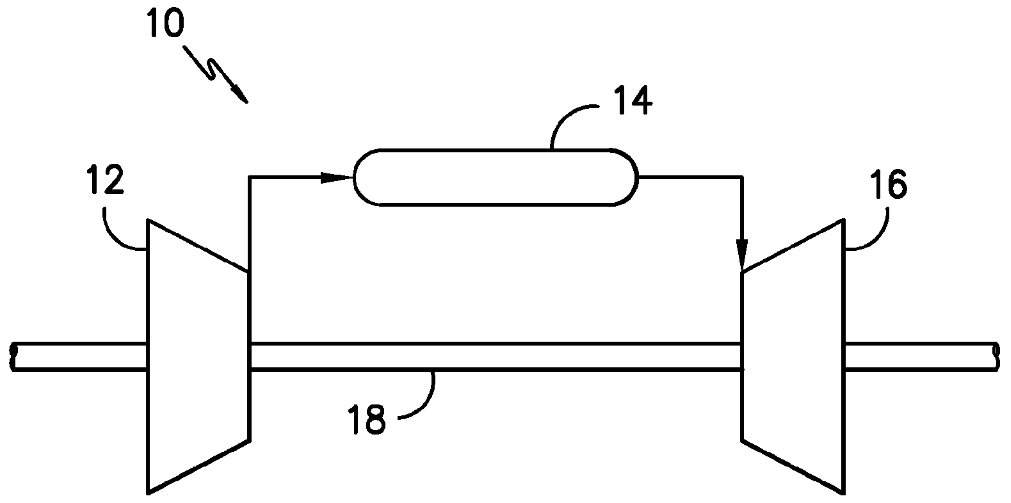
FIG. –1–
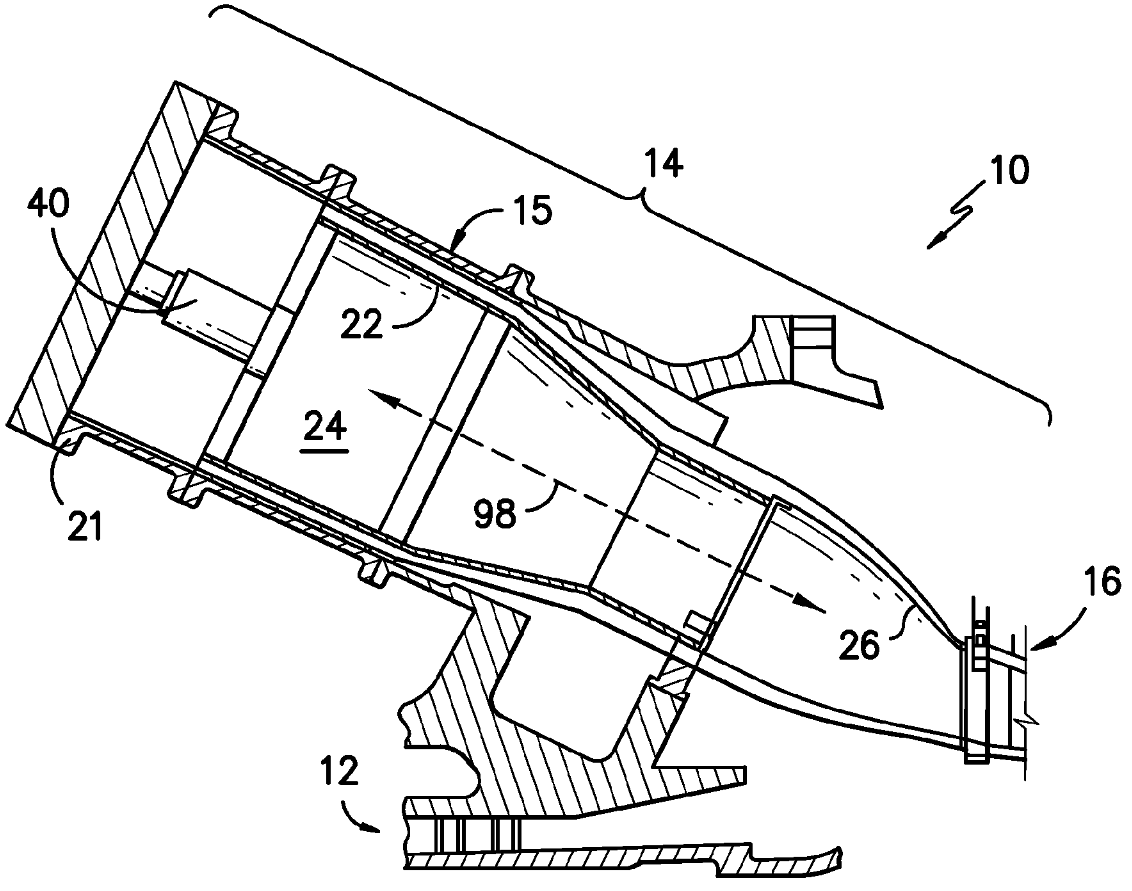
FIG. –2–

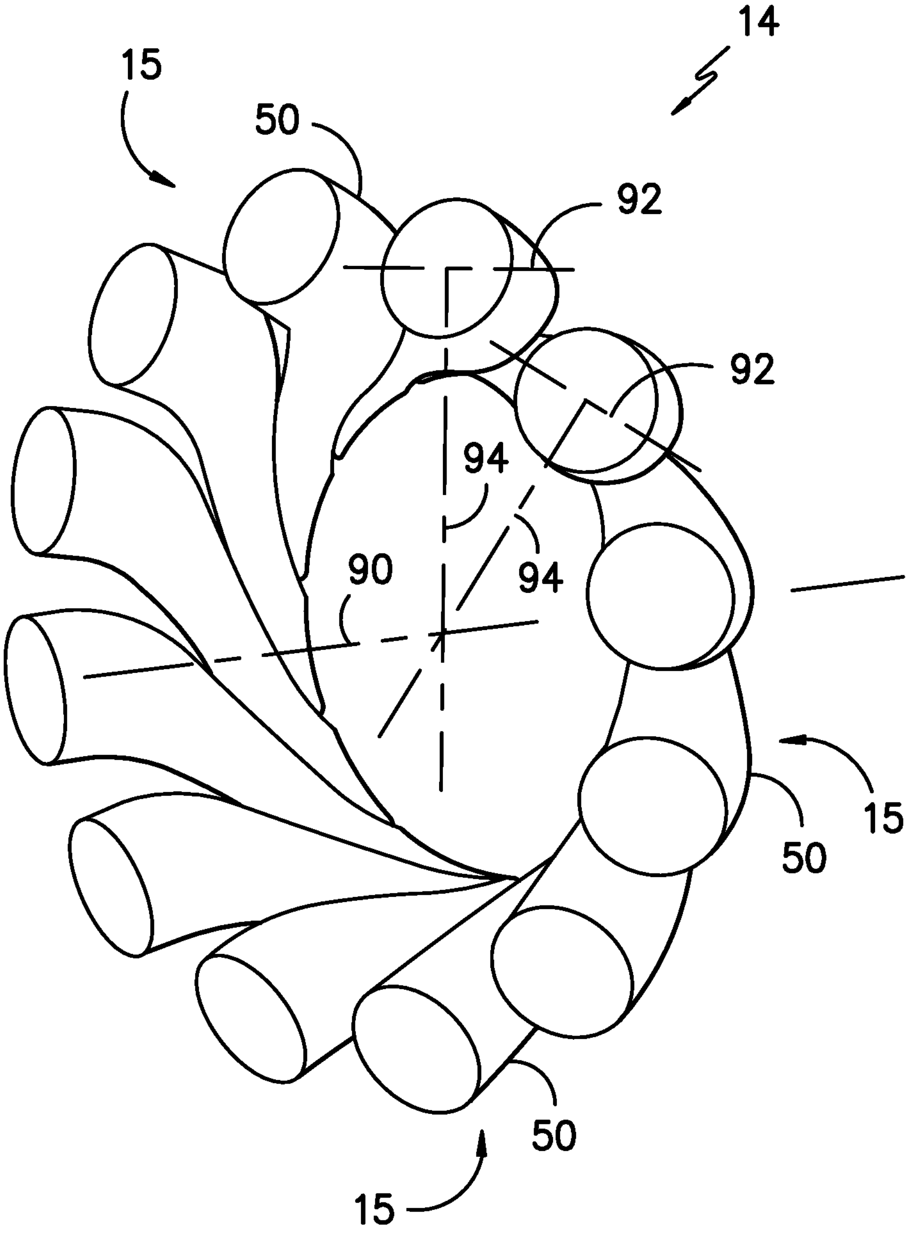
FIG. –3–

ARTICULATED TRANSITION DUCT IN TURBOMACHINE

This invention was made with government support under contract number DE-FC26-05NT42643 awarded by the Department of Energy. The government has certain rights in the invention.

FIELD OF THE INVENTION

The subject matter disclosed herein relates generally to turbomachines, such as gas turbine systems, and more particularly to articulated transition ducts, with components movable about at least one axis relative to each other, in turbomachines.

BACKGROUND OF THE INVENTION

Turbine systems are one example of turbomachines widely utilized in fields such as power generation. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to drive the compressor, an electrical generator, and other various loads.

The combustor sections of turbine systems generally include tubes or ducts for flowing the combusted hot gas therethrough to the turbine section or sections. Recently, combustor sections have been introduced which include ducts that shift the flow of the hot gas, such as by accelerating and turning the hot gas flow. For example, ducts for combustor sections have been introduced that, while flowing the hot gas longitudinally therethrough, additionally shift the flow radially or tangentially such that the flow has various angular components. These designs have various advantages, including eliminating first stage nozzles from the turbine sections. The first stage nozzles were previously provided to shift the hot gas flow, and may not be required due to the design of these ducts. The elimination of first stage nozzles may reduce associated pressure drops and increase the efficiency and power output of the turbine system.

However, the connection of these ducts to turbine sections is of increased concern. For example, because the ducts do not simply extend along a longitudinal axis, but are rather shifted off-axis from the inlet of the duct to the outlet of the duct, thermal expansion of the ducts can cause undesirable shifts in the ducts along or about various axes. These shifts can cause stresses and strains within the ducts, and may cause the ducts to fail.

Accordingly, improved combustor sections for turbomachines, such as for turbine systems, would be desired in the art. In particular, combustor sections and transition ducts thereof which allow for and accommodate thermal growth of the duct would be advantageous.

BRIEF DESCRIPTION OF THE INVENTION

Aspects and advantages of the invention will be set forth in part in the following description, or may be obvious from the description, or may be learned through practice of the invention.

In one embodiment, a turbine system is provided. The turbine system includes a transition duct comprising an inlet, an outlet, and a duct passage extending between the inlet and the outlet and defining a longitudinal axis, a radial axis, and a tangential axis. The outlet of the transition duct is offset from the inlet along the longitudinal axis and the tangential axis. The duct passage includes an upstream portion and a downstream portion. The upstream portion extends from the inlet between an inlet end and an aft end. The downstream portion extends from the outlet between an outlet end and a head end. The turbine system further includes a joint coupling the aft end of the upstream portion and the head end of the downstream portion together. The joint is configured to allow movement of the upstream portion and the downstream portion relative to each other about or along at least one axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic view of a gas turbine system according to one embodiment of the present disclosure;

FIG. 2 is a cross-sectional view of several portions of a gas turbine system according to one embodiment of the present disclosure;

FIG. 3 is a perspective view of an annular array of transition ducts according to one embodiment of the present disclosure;

DETAILED DESCRIPTION OF THE INVENTION

Figure 4:
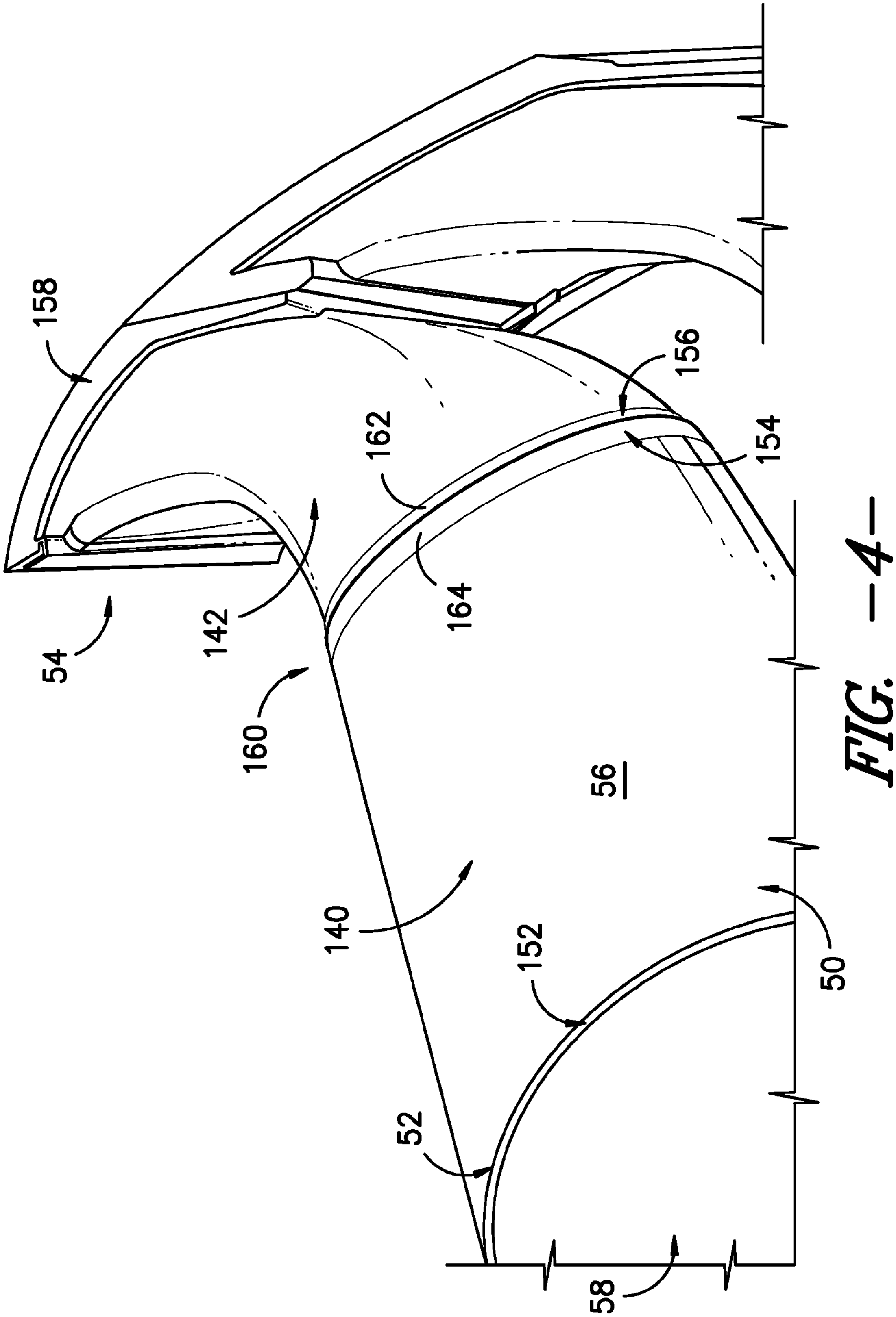
FIG. 4 is a top rear perspective view of a plurality of transition ducts and associated impingement sleeves according to one embodiment of the present disclosure.
Figure 5:
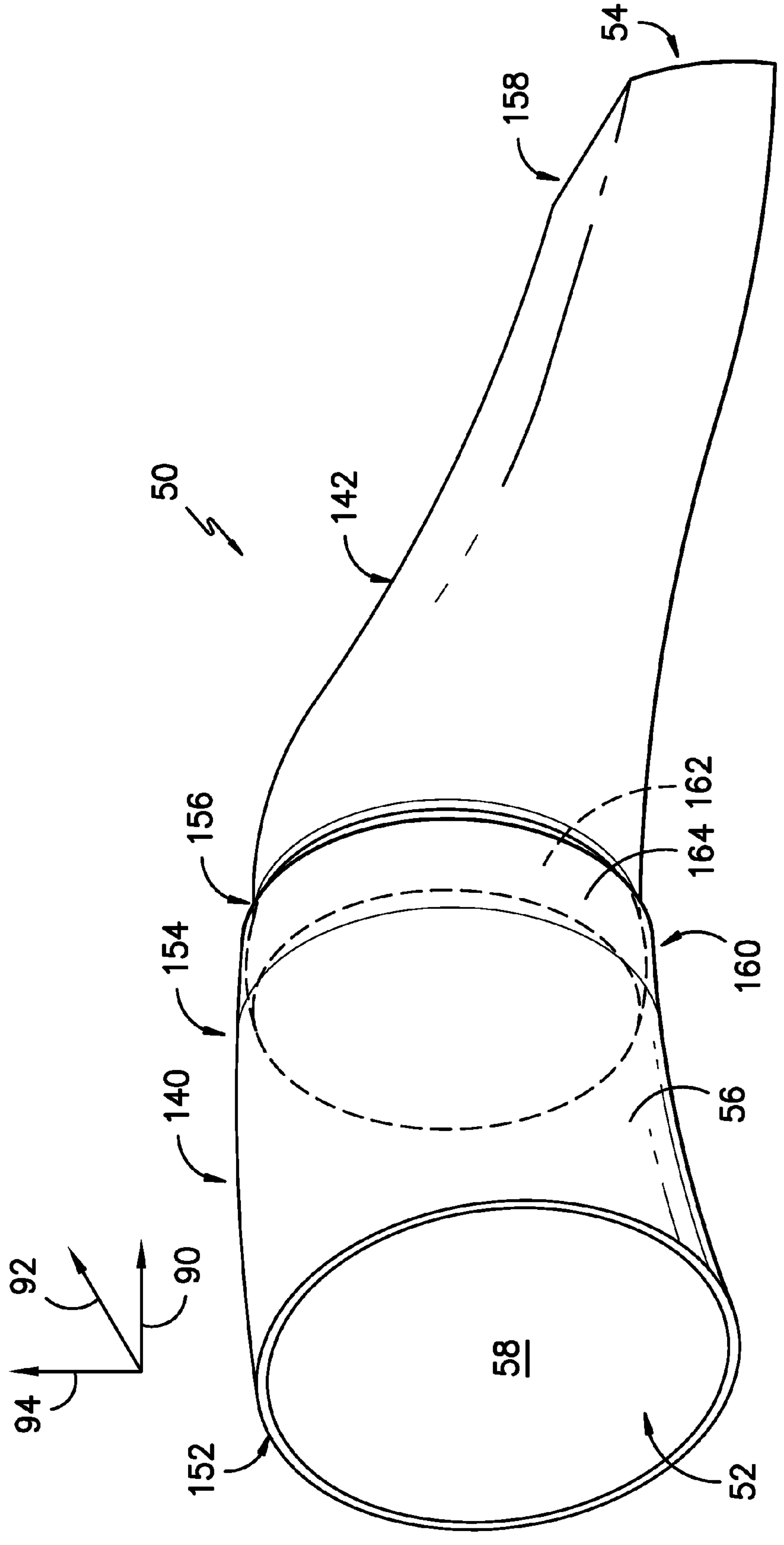
FIG. 5 is a side perspective view of a transition duct, including an upstream portion and a downstream portion, according to one embodiment of the present disclosure.
Figure 6:
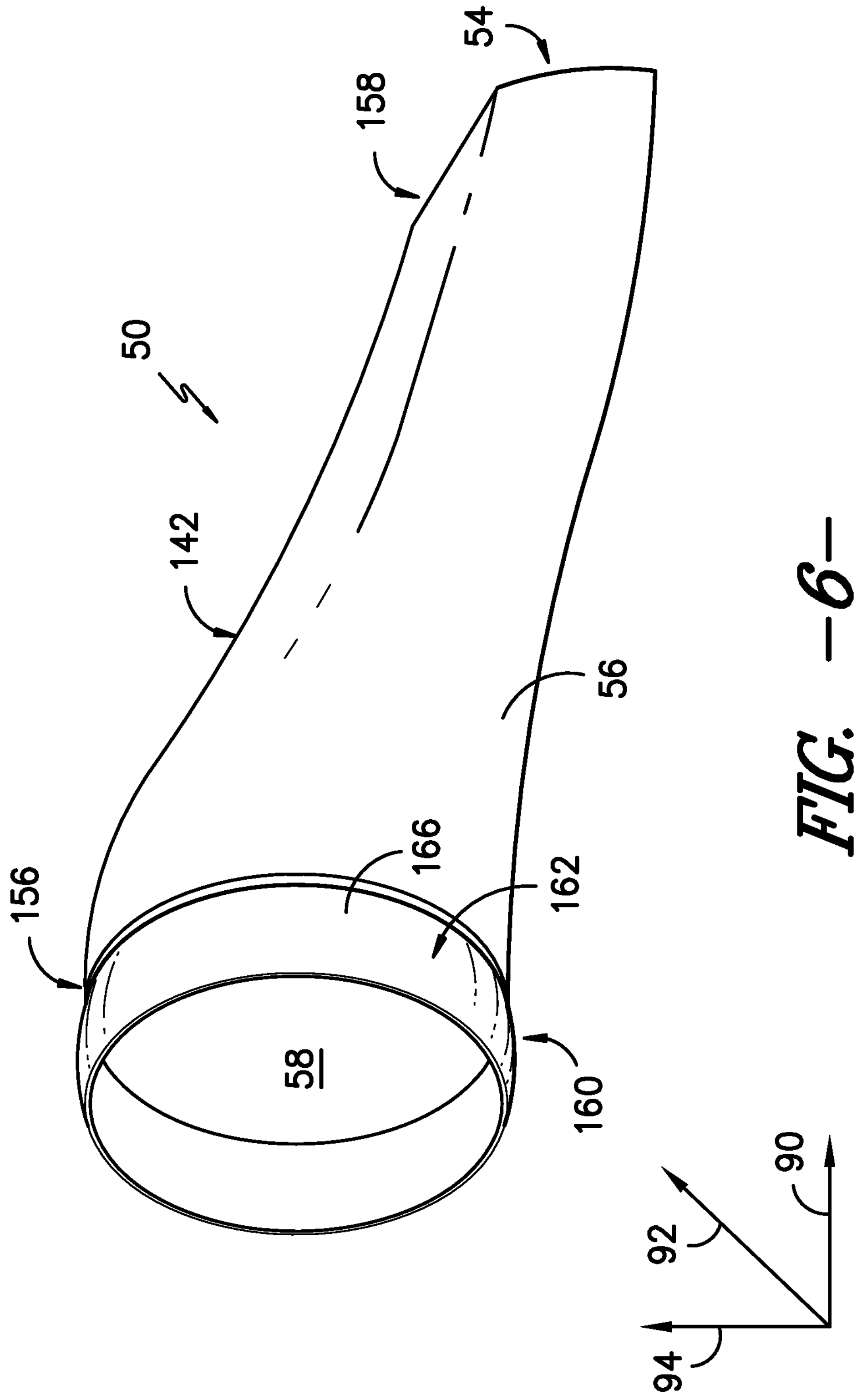
FIG. 6 is a side perspective view of a downstream portion of a transition duct according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic diagram of a turbomachine, which in the embodiment shown is a gas turbine system 10. It should be understood that the turbine system 10 of the present disclosure need not be a gas turbine system 10, but rather may be any suitable turbine system 10, such as a steam turbine system or other suitable system. Further, it should be understood that a turbomachine according to the present disclosure need not be a turbine system, but rather may be any suitable turbomachine. The gas turbine system 10 may include a compressor section 12, a combustor section 14 which may include a plurality of combustors 15 as discussed below, and a turbine section 16. The compressor section 12 and turbine section 16 may be coupled by a shaft 18. The shaft 18 may be a single shaft or a plurality of shaft segments coupled together to form shaft 18. The shaft 18 may further be coupled to a generator or other suitable energy storage device, or may be connected directly to, for example, an electrical grid. An inlet section 19 may provide an air flow to the compressor section 12, and exhaust gases may be exhausted from the turbine section 16 through an exhaust section 20 and exhausted and/or utilized in the system 10 or other suitable system, exhausted into the atmosphere, or recycled through a heat recovery steam generator.

Referring to FIG. 2, a simplified drawing of several portions of a gas turbine system 10 is illustrated. The gas turbine system 10 as shown in FIG. 2 comprises a compressor section 12 for pressurizing a working fluid, which in general is pressurized air but could be any suitable fluid, that is flowing through the system 10. Pressurized working fluid discharged from the compressor section 12 flows into a combustor section 14, which may include a plurality of combustors 15 (only one of which is illustrated in FIG. 2) disposed in an annular array about an axis of the system 10. The working fluid entering the combustor section 14 is mixed with fuel, such as natural gas or another suitable liquid or gas, and combusted. Hot gases of combustion flow from each combustor 15 to a turbine section 16 to drive the system 10 and generate power.

A combustor 15 in the gas turbine 10 may include a variety of components for mixing and combusting the working fluid and fuel. For example, the combustor 15 may include a casing 21, such as a compressor discharge casing 21. A variety of sleeves, which may be axially extending annular sleeves, may be at least partially disposed in the casing 21. The sleeves, as shown in FIG. 2, extend axially along a generally longitudinal axis 98, such that the inlet of a sleeve is axially aligned with the outlet. For example, a combustor liner 22 may generally define a combustion zone 24 therein. Combustion of the working fluid, fuel, and optional oxidizer may generally occur in the combustion zone 24. The resulting hot gases of combustion may flow generally axially along the longitudinal axis 98 downstream through the combustion liner 22 into a transition piece 26, and then flow generally axially along the longitudinal axis 98 through the transition piece 26 and into the turbine section 16.

The combustor 15 may further include a fuel nozzle 40 or a plurality of fuel nozzles 40. Fuel may be supplied to the fuel nozzles 40 by one or more manifolds (not shown). As discussed below, the fuel nozzle 40 or fuel nozzles 40 may supply the fuel and, optionally, working fluid to the combustion zone 24 for combustion.

As shown in FIGS. 3 through 7, a combustor 15 according to the present disclosure may include one or more transition ducts 50. The transition ducts 50 of the present disclosure may be provided in place of various axially extending sleeves of other combustors. For example, a transition duct 50 may replace the axially extending transition piece 26 and, optionally, the combustor liner 22 of a combustor 15. Thus, the transition duct may extend from the fuel nozzles 40, or from the combustor liner 22. As discussed below, the transition duct 50 may provide various advantages over the axially extending combustor liners 22 and transition pieces 26 for flowing working fluid therethrough and to the turbine section 16.

As shown, the plurality of transition ducts 50 may be disposed in an annular array about a longitudinal axis 90. Further, each transition duct 50 may extend between a fuel nozzle 40 or plurality of fuel nozzles 40 and the turbine section 16. For example, each transition duct 50 may extend from the fuel nozzles 40 to the turbine section 16. Thus, working fluid may flow generally from the fuel nozzles 40 through the transition duct 50 to the turbine section 16. In some embodiments, the transition ducts 50 may advantageously allow for the elimination of the first stage nozzles in the turbine section, which may reduce or eliminate any associated pressure loss and increase the efficiency and output of the system 10.

Each transition duct 50 may have an inlet 52, an outlet 54, and a passage 56 therebetween. The passage 56 defines a combustion chamber 58 therein, through which the hot gases of combustion flow. The inlet 52 and outlet 54 of a transition duct 50 may have generally circular or oval cross-sections, rectangular cross-sections, triangular cross-sections, or any other suitable polygonal cross-sections. Further, it should be understood that the inlet 52 and outlet 54 of a transition duct 50 need not have similarly shaped cross-sections. For example, in one embodiment, the inlet 52 may have a generally circular cross-section, while the outlet 54 may have a generally rectangular cross-section.

Further, the passage 56 may be generally tapered between the inlet 52 and the outlet 54. For example, in an exemplary embodiment, at least a portion of the passage 56 may be generally conically shaped. Additionally or alternatively, however, the passage 56 or any portion thereof may have a generally rectangular cross-section, triangular cross-section, or any other suitable polygonal cross-section. It should be understood that the cross-sectional shape of the passage 56 may change throughout the passage 56 or any portion thereof as the passage 56 tapers from the relatively larger inlet 52 to the relatively smaller outlet 54.

The outlet 54 of each of the plurality of transition ducts 50 may be offset from the inlet 52 of the respective transition duct 50. The term "offset", as used herein, means spaced from along the identified coordinate direction. The outlet 54 of each of the plurality of transition ducts 50 may be longitudinally offset from the inlet 52 of the respective transition duct 50, such as offset along the longitudinal axis 90.

Additionally, in exemplary embodiments, the outlet 54 of each of the plurality of transition ducts 50 may be tangentially offset from the inlet 52 of the respective transition duct 50, such as offset along a tangential axis 92. Because the outlet 54 of each of the plurality of transition ducts 50 is tangentially offset from the inlet 52 of the respective transition duct 50, the transition ducts 50 may advantageously utilize the tangential component of the flow of working fluid through the transition ducts 50 to eliminate the need for first stage nozzles in the turbine section 16, as discussed below.

Further, in exemplary embodiments, the outlet 54 of each of the plurality of transition ducts 50 may be radially offset from the inlet 52 of the respective transition duct 50, such as offset along a radial axis 94. Because the outlet 54 of each of the plurality of transition ducts 50 is radially offset from the inlet 52 of the respective transition duct 50, the transition ducts 50 may advantageously utilize the radial component of the flow of working fluid through the transition ducts 50 to further eliminate the need for first stage nozzles in the turbine section 16, as discussed below.

It should be understood that the tangential axis 92 and the radial axis 94 are defined individually for each transition duct 50 with respect to the circumference defined by the annular array of transition ducts 50, as shown in FIG. 3, and that the axes 92 and 94 vary for each transition duct 50 about the circumference based on the number of transition ducts 50 disposed in an annular array about the longitudinal axis 90.

Figure 8:
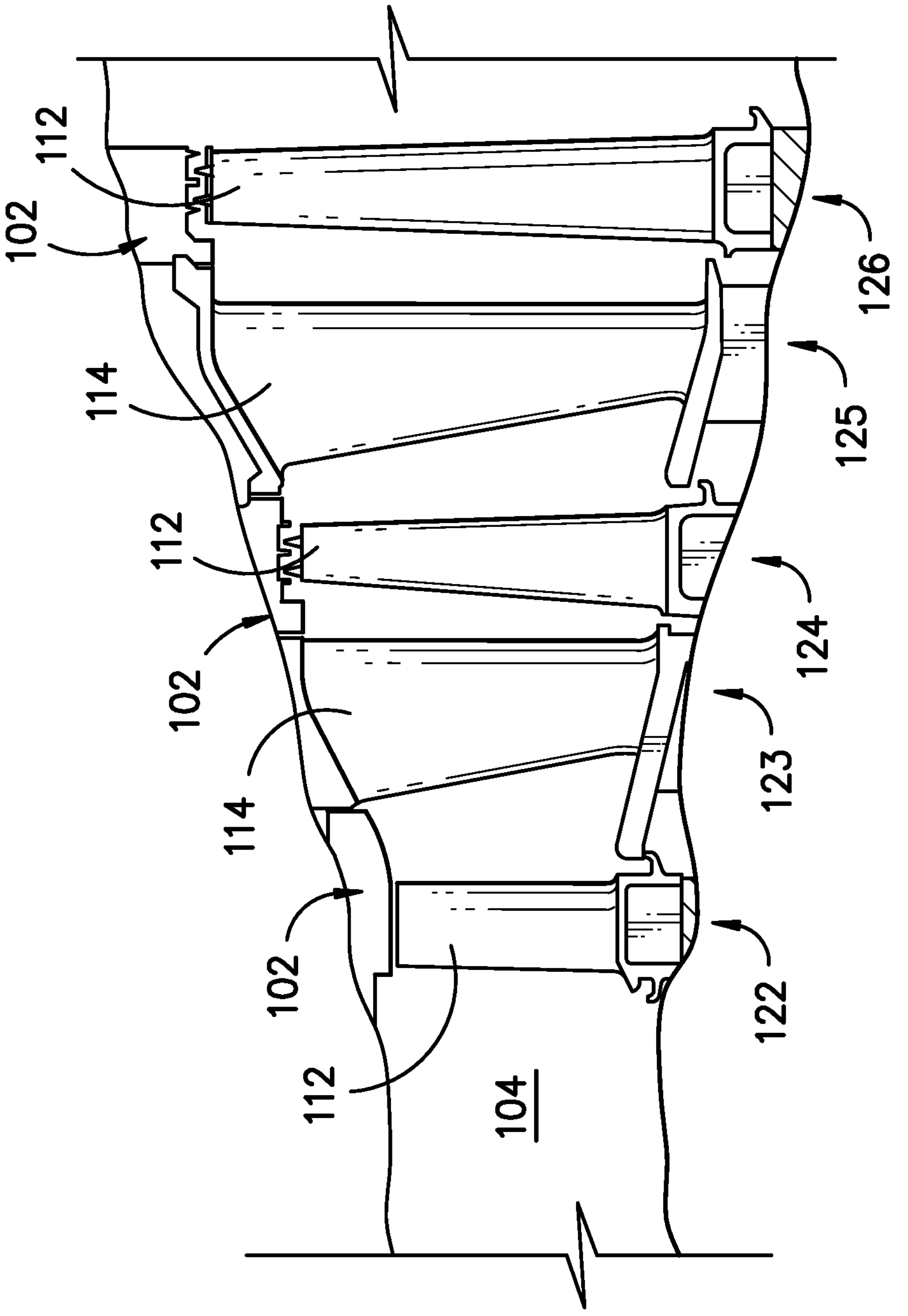

As discussed, after hot gases of combustion are flowed through the transition duct 50, they may be flowed from the transition duct 50 into the turbine section 16. As shown in FIG. 8, a turbine section 16 according to the present disclosure may include a shroud 102, which may define a hot gas path 104. The shroud 102 may be formed from a plurality of shroud blocks 106. The shroud blocks 106 may be disposed in one or more annular arrays, each of which may define a portion of the hot gas path 104 therein.

The turbine section 16 may further include a plurality of buckets 112 and a plurality of nozzles 114. Each of the plurality of buckets 112 and nozzles 114 may be at least partially disposed in the hot gas path 104. Further, the plurality of buckets 112 and the plurality of nozzles 114 may be disposed in one or more annular arrays, each of which may define a portion of the hot gas path 104.

Figure 7:
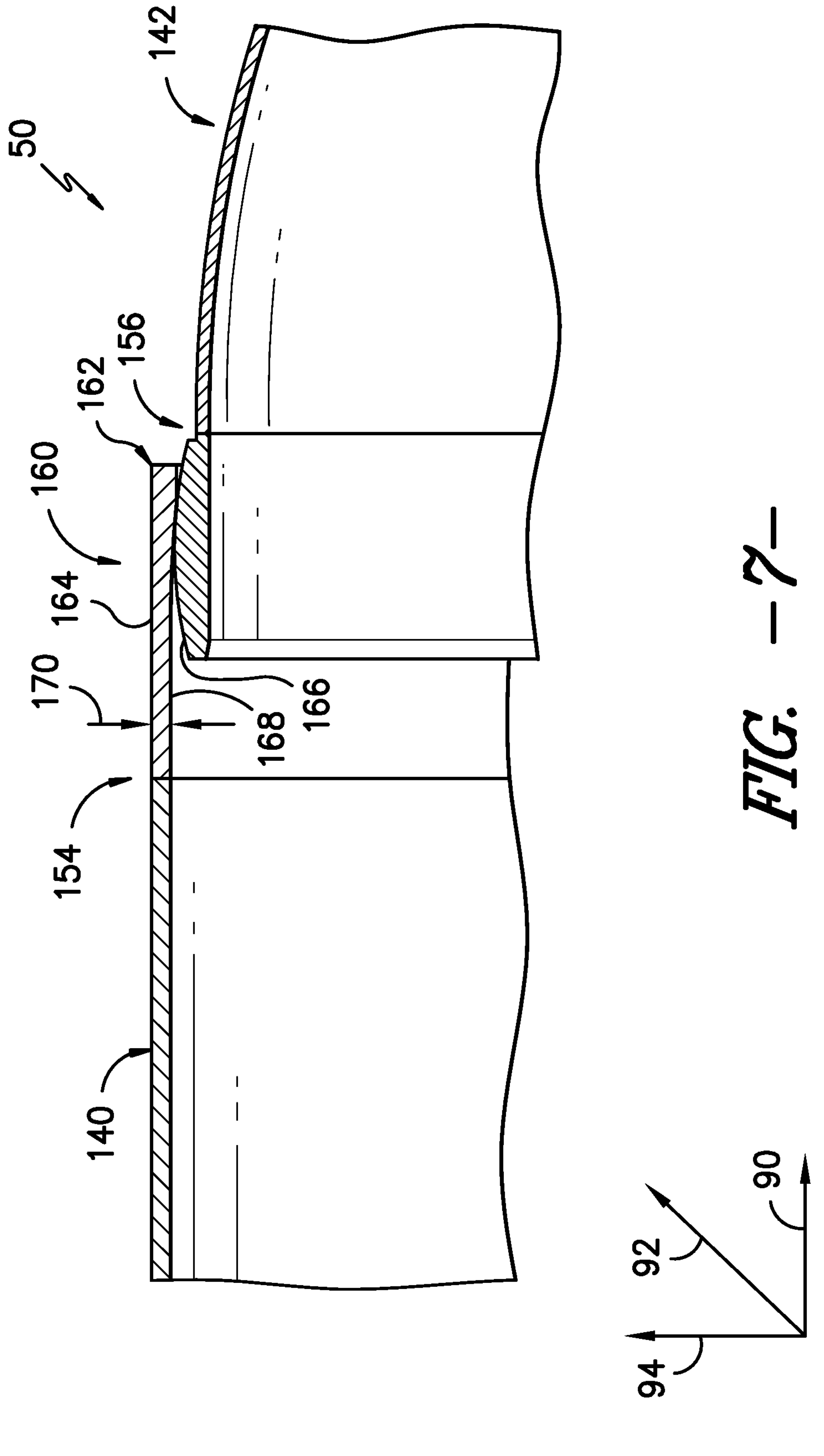
FIG. 7 is a cross-sectional view of a portion of a transition duct, including an upstream portion, a downstream portion, and a joint therebetween, according to one embodiment of the present disclosure; and, FIG. 8 is a cross-sectional view of a turbine section of a gas turbine system according to one embodiment of the present disclosure.

The turbine section 16 may include a plurality of turbine stages. Each stage may include a plurality of buckets 112 disposed in an annular array and a plurality of nozzles 114 disposed in an annular array. For example, in one embodiment, the turbine section 16 may have three stages, as shown in FIG. 7. For example, a first stage of the turbine section 16 may include a first stage nozzle assembly (not shown) and a first stage buckets assembly 122. The nozzles assembly may include a plurality of nozzles 114 disposed and fixed circumferentially about the shaft 18. The bucket assembly 122 may include a plurality of buckets 112 disposed circumferentially about the shaft 18 and coupled to the shaft 18. In exemplary embodiments wherein the turbine section is coupled to combustor section 14 comprising a plurality of transition ducts 50, however, the first stage nozzle assembly may be eliminated, such that no nozzles are disposed upstream of the first stage bucket assembly 122. Upstream may be defined relative to the flow of hot gases of combustion through the hot gas path 104.

A second stage of the turbine section 16 may include a second stage nozzle assembly 123 and a second stage buckets assembly 124. The nozzles 114 included in the nozzle assembly 123 may be disposed and fixed circumferentially about the shaft 18. The buckets 112 included in the bucket assembly 124 may be disposed circumferentially about the shaft 18 and coupled to the shaft 18. The second stage nozzle assembly 123 is thus positioned between the first stage bucket assembly 122 and second stage bucket assembly 124 along the hot gas path 104. A third stage of the turbine section 16 may include a third stage nozzle assembly 125 and a third stage bucket assembly 126. The nozzles 114 included in the nozzle assembly 125 may be disposed and fixed circumferentially about the shaft 18. The buckets 112 included in the bucket assembly 126 may be disposed circumferentially about the shaft 18 and coupled to the shaft 18. The third stage nozzle assembly 125 is thus positioned between the second stage bucket assembly 124 and third stage bucket assembly 126 along the hot gas path 104.

It should be understood that the turbine section 16 is not limited to three stages, but rather that any number of stages are within the scope and spirit of the present disclosure.

As further shown in FIGS. 4 through 7, a transition duct 50 according to the present disclosure may include a plurality of sections, portions, which are articulated with respect to each other. This articulation of the transition duct 50 may allow the transition duct 50 to move and shift during operation, allowing for and accommodating thermal growth thereof. For example, a transition duct 50 may include an upstream portion 140 and a downstream portion 142. The upstream portion 140 may include the inlet 52 of the transition duct 50, and may extend generally downstream therefrom towards the outlet 54. The downstream portion 142 may include the outlet 54 of the transition duct 50, and may extend generally upstream therefrom towards the inlet 52. The upstream portion 140 may thus include and extend between an inlet end 152 (at the inlet 52) and an aft end 154, and the downstream portion 142 may include and extend between a head end 156 and an outlet end 158 (at the outlet 158).

As shown, a joint 160 may couple the upstream portion 140 and downstream portion 142 together, and may provide the articulation between the upstream portion 140 and downstream portion 142 that allows the transition duct 50 to move during operation of the turbomachine. Specifically, the joint 160 may couple the aft end 154 and the head end 156 together. The joint 160 may be configured to allow movement of the upstream portion 140 and the downstream portion 142 relative to one another about or along at least one axis. Further, in some embodiments, the joint 160 may be configured to allow such movement about or along at least two axes, such as about or along three axes. The axis or axes can be any one or more of the longitudinal axis 90, the tangential axis 92, and/or the radial axis 94. Movement about one of these axes may thus mean that one of the upstream portion 140 or the downstream portion 142 (or both) can rotate or otherwise move about the axis with respect to the other due to the joint 160 providing this degree of freedom between the upstream portion 140 and downstream portion 142. Movement along one of these axes may thus mean that one of the upstream portion 140 or the downstream portion 142 (or both) can translate or otherwise move along the axis with respect to the other due to the joint 160 providing this degree of freedom between the upstream portion 140 and downstream portion 142.

In exemplary embodiments as shown in FIGS. 4 through 7, a joint 160 according to the present disclosure includes a generally annular contact member 162 and a generally annular socket member 164. Each of the contact member 162 and socket member 164 may be, for example, a hollow cylinder or ring. The contact member 162, or a portion thereof, generally fits within the socket member 164, such that an outer surface 166 of the contact member 162 generally contacts an inner surface 168 of the socket member 164. The contact member 162 may generally be movable within the socket member 164, such as about or along one, two, or three axes, thus providing such relative movement between the upstream portion 140 and the downstream portion 142. In exemplary embodiments, as shown, the contact member 162 may be mounted to the downstream portion 142, and the socket member 164 may be mounted to the upstream portion 140. In these embodiments, the joint 162 may allow the downstream portion 142 to move, thus providing the relative movement of the upstream portion 140 and downstream portion 142. In other embodiments, the socket member 164 may be mounted to the downstream portion 142, and the contact member 162 may be mounted to the upstream portion 140. In these embodiments, the joint 162 may allow the upstream portion 140 to move, thus providing the relative movement of the upstream portion 140 and downstream portion 142.

As mentioned, the contact member 162 and socket member 164 are each mounted to one of the upstream portion 140 and the downstream portion 142. In some embodiments, the contact member 162 and socket member 164 are mounted through welding or brazing. Alternatively, the contact member 162 and socket member 164 may be mounted through mechanical fastening, such as through use of suitable nut-bolt combinations, screws, rivets, etc. In still other embodiments, the contact member 162 and socket member 164 may be mounted by forming the contact member 162 and socket member 164 integrally with the upstream portion 140 and the downstream portion 142, such as in a singular casting procedure. Still further, any suitable mounting processes and/or apparatus are within the scope and spirit of the present disclosure.

FIGS. 4 through 7 illustrate one exemplary embodiment of contact member 162. As shown, the contact member 162 in exemplary embodiments has a generally curvilinear outer surface 166. Further, as shown, outer surface 166 may be curved such that the contact member 162 has a generally arcuate cross-sectional profile. The arcuate cross-sectional profile may extend along longitudinal axis 90, as shown, or another suitable axis. However, it should be understood that the present disclosure is not limited to the above disclosed contact member 162 shapes. Rather, the contact member 162 may have any suitable shape, curvilinear, linear, or otherwise, that allows for movement of the upstream portion 140 and downstream portion 142 relative to each other about at least one axis.

FIGS. 4 through 7 additionally illustrate one exemplary embodiment of a socket member 164. As discussed, the socket member 164 may accept the contact member 162 therein, such that outer surface 166 of the contact member 162 may contact inner surface 168 of the socket member 164. As shown, in exemplary embodiments, the inner surface 168 of the socket member 164 may be generally curvilinear. Further, the socket member 164 may have a thickness 170. The thickness 170 may, in exemplary embodiments, increase along the longitudinal axis 90 in a direction towards the outlet 54 of the transition duct 50. However, it should be understood that the present disclosure is not limited to the above disclosed socket member 164 shapes. Rather, the socket member 164 may have any suitable shape, curvilinear, linear, or otherwise, that allows for movement of the transition duct 50 about or along at least one axis.

As discussed above, the joint 160 may be configured to allow movement of the upstream portion 140 and downstream portion 142 about at least one axis. Further, in exemplary embodiments, the joint 160 may be configured to allow such movement about at least two axes. Still further, in exemplary embodiments, the joint 160 may be configured to allow such movement about three axes. Movement about an axis as discussed herein generally refers to rotational movement about the axis. For example, in some embodiments, the joint 160 may allow movement of the transition duct 50 about the tangential axis 92. As discussed above, in exemplary embodiments, the contact member 102 may have a curvilinear and/or arcuate outer surface 166. During operation of the system 10, the transition duct 50 may experience thermal expansion or other various effects that may cause the upstream portion 140 and downstream portion 142, such as the respective aft end 154 and head end 156, to move. The outer surface 166, in cooperation with the inner surface 168 of the socket member 164, may allow the transition duct 50 to rotate about the tangential axis 92, thus preventing stresses in the transition duct 50. In some embodiments, the contact member 140 may allow such rotation of the upstream portion 162 relative to the downstream portion 142, or vice versa, about the tangential axis 92 up to a maximum of approximately 5 degrees of rotation, or up to a maximum of 2 degrees of rotation. However, it should be understood that the present disclosure is not limited to the above disclosed degrees of rotation, and rather that any suitable rotation of the upstream portion 140 and downstream portion 142 relative to each other, is within the scope and spirit of the present disclosure.

Additionally or alternatively, in some embodiments, the joint 160 may allow movement of the transition duct 50 about the radial axis 94. As discussed above, in exemplary embodiments, the contact member 102 may have a curvilinear and/or arcuate outer surface 166. During operation of the system 10, the transition duct 50 may experience thermal expansion or other various effects that may cause the upstream portion 140 and downstream portion 142, such as the respective aft end 154 and head end 156, to move. The outer surface 166, in cooperation with the inner surface 168 of the socket member 164, may allow the transition duct 50 to rotate about the radial axis 94, thus preventing stresses in the transition duct 50. In some embodiments, the contact member 140 may allow such rotation of the upstream portion 162 relative to the downstream portion 142, or vice versa, about the radial axis 94 up to a maximum of approximately 5 degrees of rotation, or up to a maximum of 2 degrees of rotation. However, it should be understood that the present disclosure is not limited to the above disclosed degrees of rotation, and rather that any suitable rotation of the upstream portion 140 and downstream portion 142 relative to each other, is within the scope and spirit of the present disclosure.

Additionally or alternatively, in some embodiments, the joint 160 may allow movement of the transition duct 50 about the longitudinal axis 90. As discussed above, in exemplary embodiments, the contact member 102 may have a curvilinear and/or arcuate outer surface 166. During operation of the system 10, the transition duct 50 may experience thermal expansion or other various effects that may cause the upstream portion 140 and downstream portion 142, such as the respective aft end 154 and head end 156, to move. The outer surface 166, in cooperation with the inner surface 168 of the socket member 164, may allow the transition duct 50 to rotate about the longitudinal axis 90, thus preventing stresses in the transition duct 50. In some embodiments, the contact member 140 may allow such rotation of the upstream portion 162 relative to the downstream portion 142, or vice versa, about the longitudinal axis 90 up to a maximum of approximately 5 degrees of rotation, or up to a maximum of 2 degrees of rotation. However, it should be understood that the present disclosure is not limited to the above disclosed degrees of rotation, and rather that any suitable rotation of the upstream portion 140 and downstream portion 142 relative to each other, is within the scope and spirit of the present disclosure.

Still further, in exemplary embodiments, the joint 160 further allows movement of the upstream portion 140 and downstream portion 142 relative to each other along at least one axis. Further, in exemplary embodiments, the joint 160 may be configured to allow such movement along at least two axes. Still further, in exemplary embodiments, the joint 160 may be configured to allow such movement along three axes. Movement along an axis as discussed herein generally refers to translational movement along the axis. For example, in some embodiments, the joint 160 may allow movement of the transition duct 50 along the longitudinal axis 90. For example, the contact member 162 in exemplary embodiments may be in contact with the socket member 164 but not mounted or attached to any surface thereof. Thus, the contact member 162 may slide along the longitudinal axis 90 if the upstream portion 140 and/or the downstream portion 142 moves along the longitudinal axis 90, such as due to thermal expansion or other various effects that may cause the transition duct 50, such as any portion of the upstream portion 140 and/or downstream portion 142, to move.

Additionally or alternatively, in some embodiments, the joint 160 may allow movement of the transition duct 50 along the tangential axis 92. For example, the contact member 162 in exemplary embodiments may be in contact with the socket member 164 but not mounted or attached to any surface thereof. Thus, the contact member 162 may slide along the tangential axis 92 if the upstream portion 140 and/or the downstream portion 142 moves along the tangential axis 92, such as due to thermal expansion or other various effects that may cause the transition duct 50, such as any portion of the upstream portion 140 and/or downstream portion 142, to move.

Additionally or alternatively, in some embodiments, the joint 160 may allow movement of the transition duct 50 along the radial axis 94. For example, the contact member 162 in exemplary embodiments may be in contact with the socket member 164 but not mounted or attached to any surface thereof. Thus, the contact member 162 may slide along the radial axis 94 if the upstream portion 140 and/or the downstream portion 142 moves along the radial axis 94, such as due to thermal expansion or other various effects that may cause the transition duct 50, such as any portion of the upstream portion 140 and/or downstream portion 142, to move.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbine system, comprising:

a transition duct comprising an inlet, an outlet, and a duct passage extending between the inlet and the outlet and defining a longitudinal axis, a radial axis, and a tangential axis, the outlet of the transition duct offset from the inlet along the longitudinal axis, the radial axis and the tangential axis, the duct passage comprising an upstream portion and a downstream portion, the upstream portion extending from the inlet between an inlet end and an aft end, the downstream portion extending from the outlet between an outlet end and a head end;

a joint coupling the aft end of the upstream portion and the head end of the downstream portion together, the joint configured to allow movement of the upstream portion and the downstream portion relative to each other about or along at least one axis, wherein the joint comprises a generally annular contact member and a generally annular socket member, the contact member movable within the socket member, the contact member connected to and axially extending from one of the aft end of the upstream portion and the head end of the downstream portion, the socket member connoted to the other of the aft end of the upstream portion and the head end of the downstream portion; and a turbine section in communication with the transition duct, the turbine section comprising a first stage bucket assembly, wherein no nozzles are disposed upstream of the first stage bucket assembly.

2. The turbine system of claim 1, wherein the joint is configured to allow movement of the upstream portion and the downstream portion relative to each other about or along at least two axes.

3. The turbine system of claim 1, wherein the joint is configured to allow movement of the upstream portion and the downstream portion relative to each other about or along three axes.

4. The turbine system of claim 1, wherein the contact member is mounted to the head end of the downstream portion and the socket member is mounted to the aft end of the upstream portion.

5. The turbine system of claim 1, wherein the contact member has a generally curvilinear outer surface.

6. The turbine system of claim 1, wherein the contact member has a generally arcuate cross-sectional profile.

7. The turbine system of claim 6, wherein the generally arcuate cross-sectional profile extends along the longitudinal axis.

8. The turbine system of claim 1, wherein the socket member has a generally curvilinear inner surface.

9. The turbine system of claim 8, wherein the socket member has a thickness, and wherein the thickness increases along the longitudinal axis towards the outlet.

10. A turbomachine, comprising:

an inlet section;

an exhaust section;

a compressor section;

a combustor section, the combustor section comprising:

a transition duct comprising an inlet, an outlet, and a duct passage extending between the inlet and the outlet and defining a longitudinal axis, a radial axis, and a tangential axis, the outlet of the transition duct offset from the inlet along the longitudinal axis, the radial axis and the tangential axis, the duct passage comprising an upstream portion and a downstream portion, the upstream portion extending from the inlet between an inlet end and an aft end, the downstream portion extending from the outlet between an outlet end and a head end; and a joint coupling the aft end of the upstream portion and the head end of the downstream portion together, the joint configured to allow movement of the upstream portion and the downstream portion relative to each other about or along at least one axis, wherein the joint comprises a generally annular contact member and a generally annular socket member, the contact member movable within the socket member, the contact member connected to and axially extending from one of the aft end of the upstream portion and the head end of the downstream portion, the socket member connected to the other of the aft end of the upstream portion and the head end of the downstream portion; and a turbine section in communication with the transition duct, the turbine section comprising a first stage bucket assembly, wherein no nozzles are disposed upstream of the first stage bucket assembly.

11. The turbomachine of claim 10, wherein the joint is configured to allow movement of the upstream portion and the downstream portion relative to each other about or along at least two axes.

12. The turbomachine of claim 10, wherein the joint is configured to allow movement of the upstream portion and the downstream portion relative to each other about or along three axes.

13. The turbomachine of claim 10, wherein the contact member is mounted to the head end of the downstream portion and the socket member is mounted to the aft end of the upstream portion.

* * * * *